United States Patent
McKinzie

(10) Patent No.: US 9,382,997 B2
(45) Date of Patent: Jul. 5, 2016

(54) GEAR SET LUBRICATION SYSTEM AND METHOD

(71) Applicant: DEERE & COMPANY, Moline, IL (US)

(72) Inventor: Kyle K. McKinzie, Altamont, KS (US)

(73) Assignee: Deere & Company, Moline, IL (US)

( * ) Notice: Subject to any disclaimer, the term of this patent is extended or adjusted under 35 U.S.C. 154(b) by 61 days.

(21) Appl. No.: 14/340,273

(22) Filed: Jul. 24, 2014

(65) Prior Publication Data

US 2016/0025208 A1 Jan. 28, 2016

(51) Int. Cl.
*F16H 57/04* (2010.01)

(52) U.S. Cl.
CPC ......... *F16H 57/0479* (2013.01); *F16H 57/043* (2013.01); *F16H 57/0482* (2013.01)

(58) Field of Classification Search
CPC   F16H 57/0479; F16H 57/0482; F16H 57/043
USPC ................................. 475/159, 331; 184/6.12
See application file for complete search history.

(56) References Cited

U.S. PATENT DOCUMENTS

| | | | | |
|---|---|---|---|---|
| 2,127,463 | A * | 8/1938 | Chilton | F16H 1/2836 475/159 |
| 2,943,517 | A * | 7/1960 | William | F16H 3/54 184/11.1 |
| 3,438,462 | A | 4/1969 | Nelson | |
| 3,821,908 | A | 7/1974 | Marsch et al. | |
| 8,308,602 | B2 * | 11/2012 | Hicks | F16H 1/2836 475/331 |
| 8,425,361 | B1 * | 4/2013 | Beckner | F16H 57/04 475/159 |
| 2004/0060774 | A1 * | 4/2004 | Oshidari | F16H 57/0479 184/6.12 |
| 2012/0100950 | A1 | 4/2012 | Deans | |
| 2013/0217529 | A1 * | 8/2013 | Gunji | B60K 7/0007 475/1 |

FOREIGN PATENT DOCUMENTS

| | | | | |
|---|---|---|---|---|
| JP | | 406201022 A * | 7/1994 | F16H 57/02 |
| JP | WO 2009004836 A1 * | | 1/2009 | F16H 57/0469 |

OTHER PUBLICATIONS

English translation of JP406201022A; translationportal.epo.org; Nov. 17, 2015.*
The Standard Motor Co. Ltd., Service Instruction Manual for the Laycock-De-Normanville Overdrive Unit With Electrical Control, Publication Part No. 502274, Admitted Prior Art.

* cited by examiner

*Primary Examiner* — Roger Pang
(74) *Attorney, Agent, or Firm* — Ingrassia, Fisher & Lorenz PC

(57) ABSTRACT

A lubricating system and method can be used to meter lubricating fluid to a pinion and pinion bearing mounted to a pinion carrier. A sun gear shaft may include a channel fluidly connected to a lubricating fluid reservoir through a bore in the sun gear shaft. A sleeve may be fluidly sealed on its axial ends over the channel to form a chamber with the channel. The sleeve may include a plurality of through-holes to allow lubricating fluid to flow through a plurality of radial bores extending through the pinion carrier. Lubricating fluid may flow through an annular gap passage in a pinion shaft to provide lubricating fluid to the pinion and the pinion bearing.

20 Claims, 7 Drawing Sheets

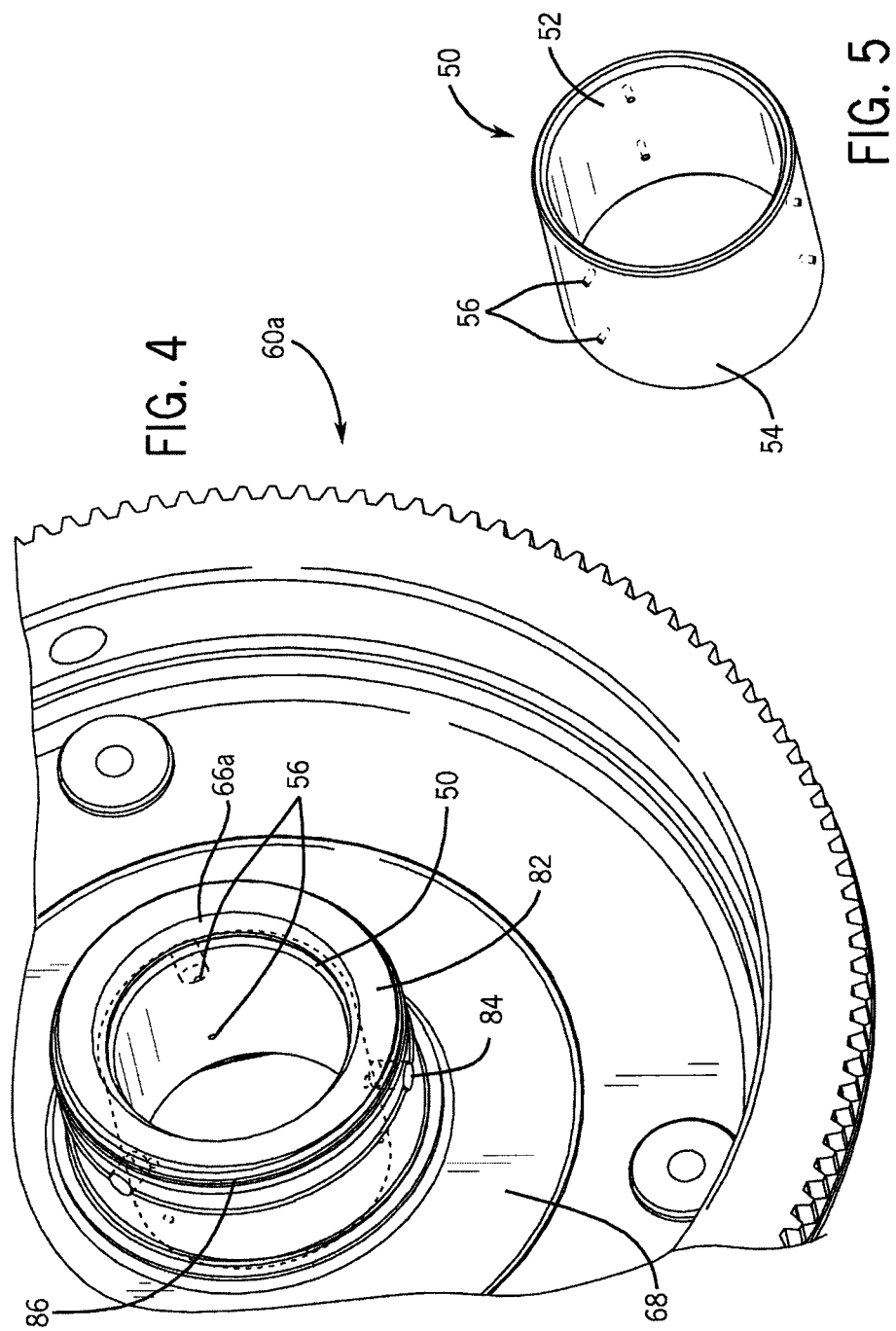

GEAR SET LUBRICATION SYSTEM AND METHOD

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates to gear set assemblies, and in particular to an arrangement for lubricating a planetary gear assembly.

BACKGROUND OF THE DISCLOSURE

Gear and shaft assemblies come in various configurations. For example, planetary gear sets, typically include a sun gear, a ring gear, a pinion carrier, and at least one pinion (also known as a planet gear). A simple planetary gear set may have one pinion rotatably mounted to the pinion carrier, while a compound planetary gear set may have a plurality of pinions rotatably mounted to the pinion carrier. Each pinion is rotatably mounted to the pinion carrier through a pinion shaft coupled to the pinion carrier. The pinion carrier may revolve around the sun gear's axis of rotation or may be stationary.

Planetary gear sets are typically part of a larger mechanical assembly, such as a transmission for a work vehicle. Planetary gear sets allow for adjustment of the speed and torque of an output shaft by adjusting a gear ratio between an input shaft and the output shaft. This may be accomplished by locking one of the gears, such that it is stationary with respect to a shaft it is rotatably mounted to, or by selecting a second set of gears in a stacked planetary gear set. For example, the sun gear may be held stationary, while the pinion and ring gear are allowed to rotate, the pinion may be held stationary, allowing the sun and ring gears to rotate, or the ring gear may be held stationary, allowing the sun gear and pinion to rotate. Each combination of rotating and stationary gears results in a different gear ratio between the input and output shafts. Alternatively, by locking two gears (such as the sun and ring gears, the ring gear and the pinion, or the pinion and the sun gear) will cause the entire planetary gear set to rotate together. This results in the rotational speed of the input and output shafts being equal.

A common problem in planetary gear assemblies is how to cost effectively supply lubricating fluid to the gears and gear bearings. In some applications, splash lubrication can be utilized. However, in high-performance, long-life applications, it may be desired that lubrication be provided under pressure to ensure that lubricating fluid is provided to the bearing at all times. An additional problem exists in developing such a system that is also low-profile and compact.

SUMMARY OF THE DISCLOSURE

A gear lubricating system and method are disclosed, such as for providing lubricating fluid to a pinion and pinion bearing of a gear set.

According to one aspect of the disclosure, a shaft lubricating fluid delivery system may include a sun gear shaft having a channel extending circumferentially around at least a portion of the outer surface of the sun gear shaft. The sun gear shaft may include a sun gear shaft axial bore extending at least partially through the sun gear shaft in an axial direction and a sun gear shaft radial bore extending radially from the sun gear shaft axial bore to the channel. A sleeve may be disposed radially around the channel forming a chamber in cooperation with the channel. The sleeve may include a first through-hole. A first gear carrier may include an inner radial surface and an outer radial surface, with a first gear carrier first radial bore extending from the inner radial surface at least partially toward the outer radial surface. The first gear carrier first radial bore may be fluidly connected to the chamber through the first through-hole.

According to another aspect of the disclosure, the shaft lubricating fluid delivery system may include a sun gear shaft having a channel extending circumferentially around at least a portion of the outer surface of the sun gear shaft. The sun gear shaft may include a sun gear shaft axial bore extending at least partially through the sun gear shaft in an axial direction and a sun gear shaft radial bore extending radially from the sun gear shaft axial bore to the channel. A sleeve may be disposed radially around the channel to form a chamber in cooperation with the channel. The sleeve may include two through-holes. A first gear carrier may include an inner radial surface and an outer radial surface with a first gear carrier first radial bore extending from the inner radial surface at least partially toward the outer radial surface. A second gear carrier may include an inner radial surface and an outer radial surface with a second gear carrier first radial bore extending from the inner radial surface at least partially toward the outer radial surface. The first gear carrier first radial bore may be fluidly connected to the one through-hole and the second gear carrier first radial bore may be fluidly connected to another through-hole.

According to another aspect of the disclosure, a method of lubricating the gear and the gear bearing is provided. The method may include providing a sun gear shaft having a channel extending circumferentially around a portion of the sun gear shaft. A sun gear shaft radial bore may extend from the channel at least partially through the sun gear shaft in a radial direction and a sun gear shaft axial bore may extend in an axial direction at least partially through the sun gear shaft and through the sun gear shaft radial bore. A sleeve with a first through-hole may be disposed radially outward and circumferentially and axially over the channel and mounts a first gear carrier, which may include a first gear carrier radial bore. The sun gear shaft axial bore, the sun gear shaft radial bore, the channel, the through-hole, and the first gear carrier radial bore may be fluidly connected, and a lubricating fluid may be supplied to the sun gear shaft.

These and other features and advantages of the present disclosure will become clear to a person skilled in the art after reading the following detailed description and in consideration of the drawings.

BRIEF DESCRIPTION OF THE DRAWINGS

FIG. 4 is an enlarged partial perspective view of a sun gear and a sun gear shaft of the example stacked planetary gear set of FIG. 2.

FIG. 5 is an enlarged front perspective view of a sealing sleeve of the example stacked planetary gear set of FIG. 2.

Like reference numerals in the drawings indicate like components, parts, or operations.

DETAILED DESCRIPTION

The following describes one or more example embodiments of the disclosed gear set lubrication system and method, as shown in the accompanying figures of the drawings described briefly above. Various modifications to the example embodiments may be contemplated by one of skill in the art.

In certain high-performance and long-life applications, gears and gear bearings may need to be kept thoroughly lubricated at all times. Inadequate lubrication can result in excessive wear and decreased life. Lubricating fluid may be supplied under pressure to ensure adequate lubrication of the gears and bearings. Further, in certain applications, it may be desired to lubricate gears and bearings housed in a low-profile, compact envelopment.

Figure 1:
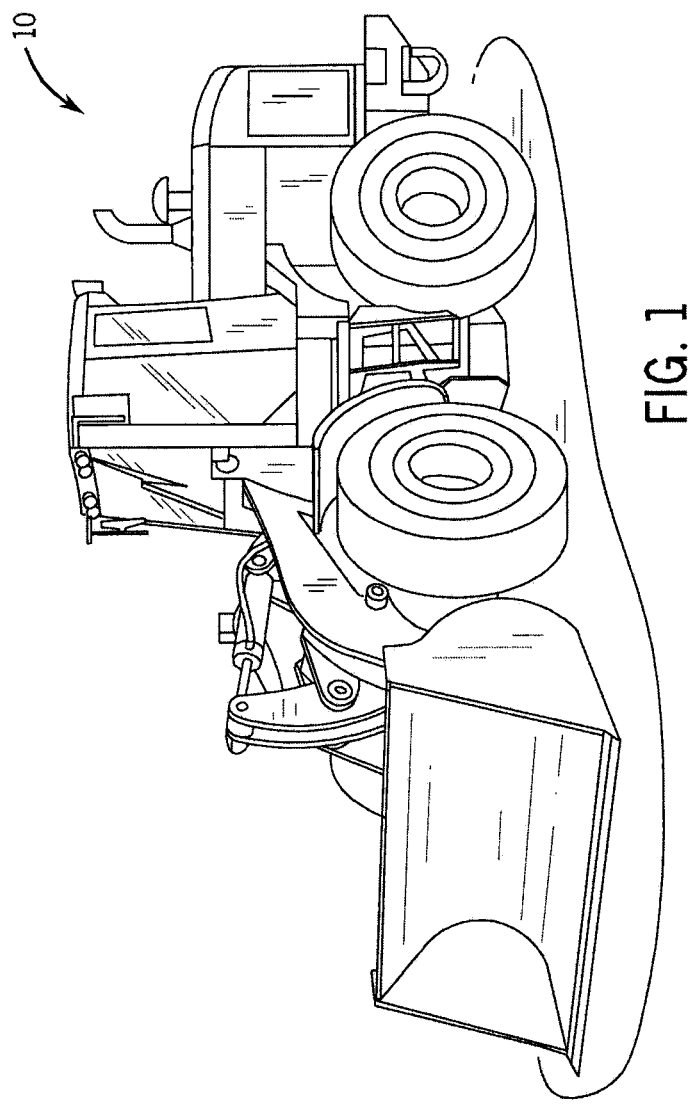
FIG. 1 is an example work vehicle having a lubrication system according to the present disclosure.

FIG. 1 shows an example work vehicle 10, in the form of a wheeled loader, having a gear lubrication system according to the present disclosure. In particular, the work vehicle 10 may have one or more gear sets, such as a stacked planetary gear set 20 (shown in FIG. 2) used in the transmission of the work vehicle 10. It will be understood that various other gear set configurations may also be possible and that the gear set 20 may be used in a variety of machinery, vehicles, or other non-vehicular settings.

Figure 2:
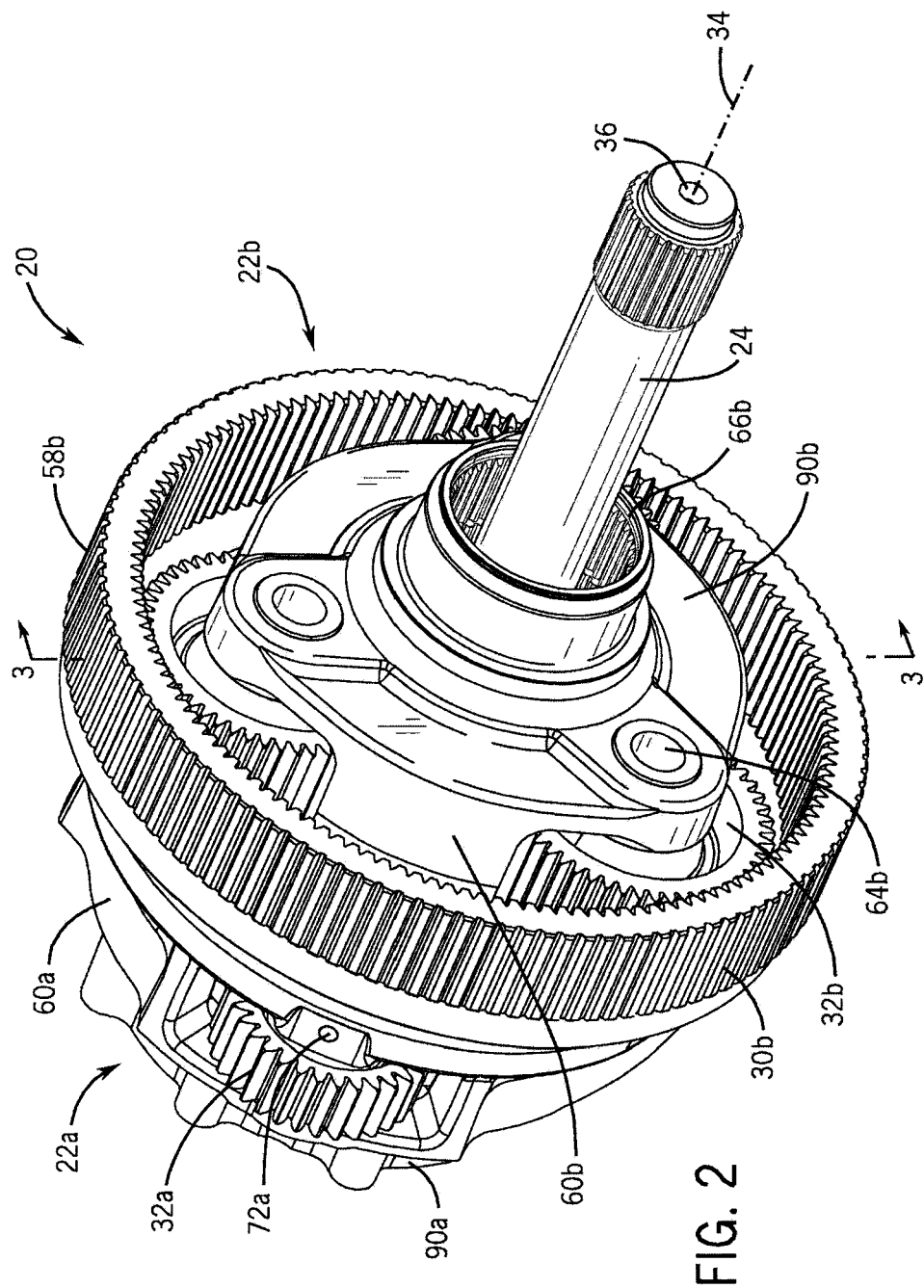
FIG. 2 is a front perspective view of an example stacked planetary gear set in the work vehicle of FIG. 1.

Referring now to FIG. 2, the example stacked planetary gear set 20 may include a first planetary gear set 22a and a second planetary gear set 22b disposed axially from one another and sharing a common sun gear shaft 24 and a housing 26. It will be appreciated that the second planetary gear set 22b can have a similar assembly as the first planetary gear set 22a. Components of the first planetary gear set 22a will be designated with the suffix "a", whereas components of the second planetary gear set 22b will be designated with the suffix "b". It will also be appreciated that a single planetary gear set, using only the first planetary gear set 22a, may alternatively be used.

Generally, the first planetary gear set 22a may include a sun gear 28a, a ring gear (not shown), and at least one pinion (or planet gear) 32a. Similarly, the second planetary gear set 22b may include a sun gear 28b, a ring gear 30b, and at least one pinion 32b. The second planetary gear set 22b may be disposed axially forward of the first planetary gear set 22a, as defined by axis 34.

Figure 3:
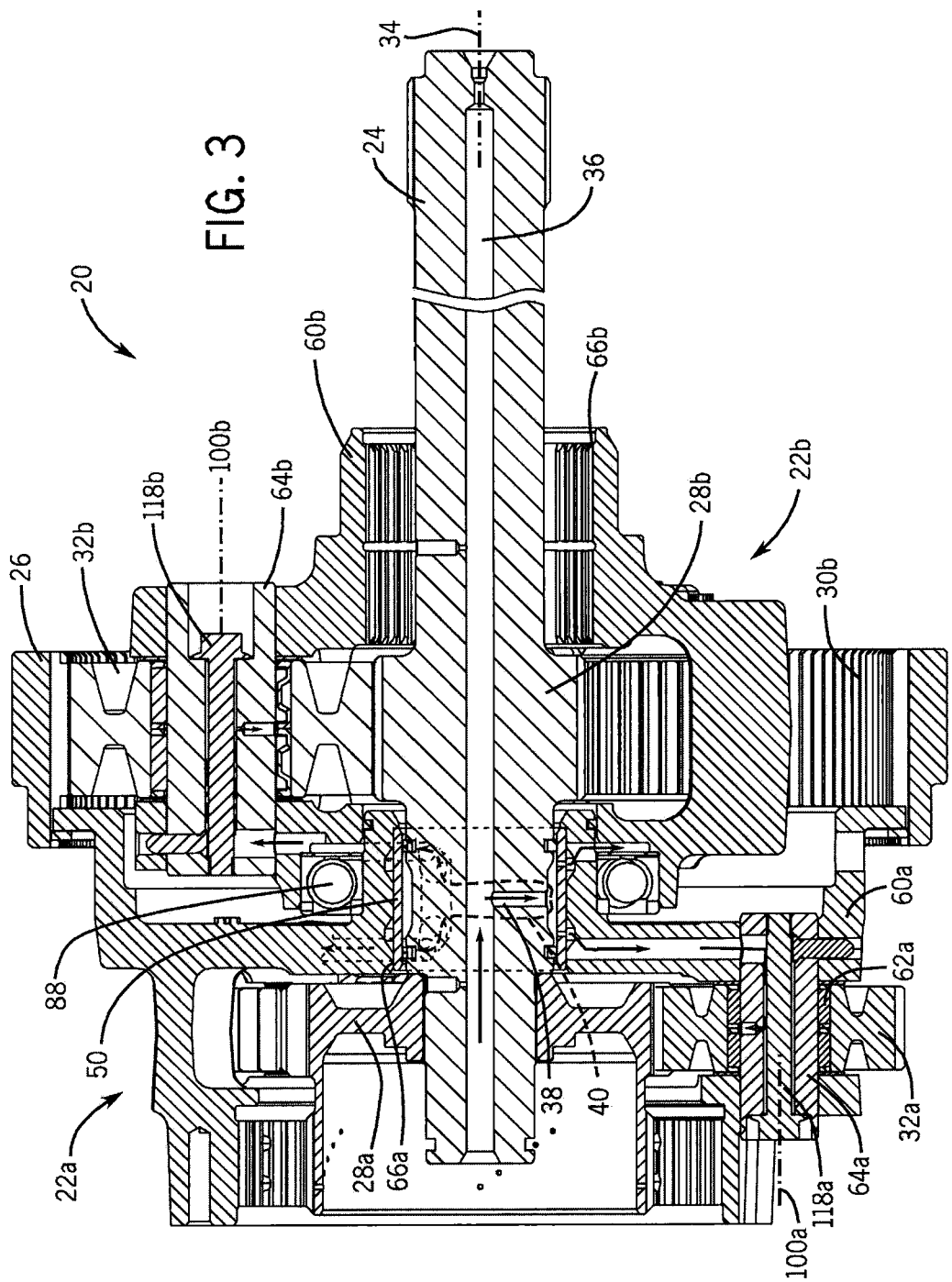
FIG. 3 is a cross-sectional view of the example stacked planetary gear set of FIG. 2.

Referring to FIGS. 2 and 3, the sun gear shaft 24 may be coaxial with, and rotate about, the axis 34. A sun gear shaft axial bore 36 may pass at least partially through the sun gear shaft 24 in an axial direction. A sun gear shaft radial bore 38 may extend radially from the sun gear shaft axial bore 36 to a channel 40. The sun gear 28a may be axially and rotationally retained on the sun gear shaft 24, such as through a retaining ring and/or splines on the sun gear shaft 24. The sun gear 28a may include a plurality of gear teeth on its outer radial surface for engaging the pinion 32a. The gear teeth may, for example, be for a spur gear or a helical gear. In some implementations, the type of gear teeth used for the sun gear 28a should similarly be used for the ring gear (not shown) and the pinion 32a.

The channel 40 may extend along the circumference of the sun gear shaft 24 and a radial distance inward from the outer surface of the sun gear shaft 24. The channel 40 may be narrowest, in an axial direction, radially closest to the axis 34. The channel 40 may widen axially as the channel 40 extends radially outward from the axis 34 toward the outer surface of the sun gear shaft 24. The channel 40 may be disposed axially between the first sun gear 28a and the second sun gear 28b. Axially forward of the channel 40 may be a first circumferential groove 42 extending from the outer radial surface of the sun gear shaft 24 for accepting a first sealing ring 44. Similarly, axially rearward of the channel 40 may be a second circumferential groove 46 extending from the outer radial surface of the sun gear shaft 24 for accepting a second sealing ring 48. The sealing rings 44 and 48 may, for example, be sealing rings or any other suitable seals.

Figure 7:
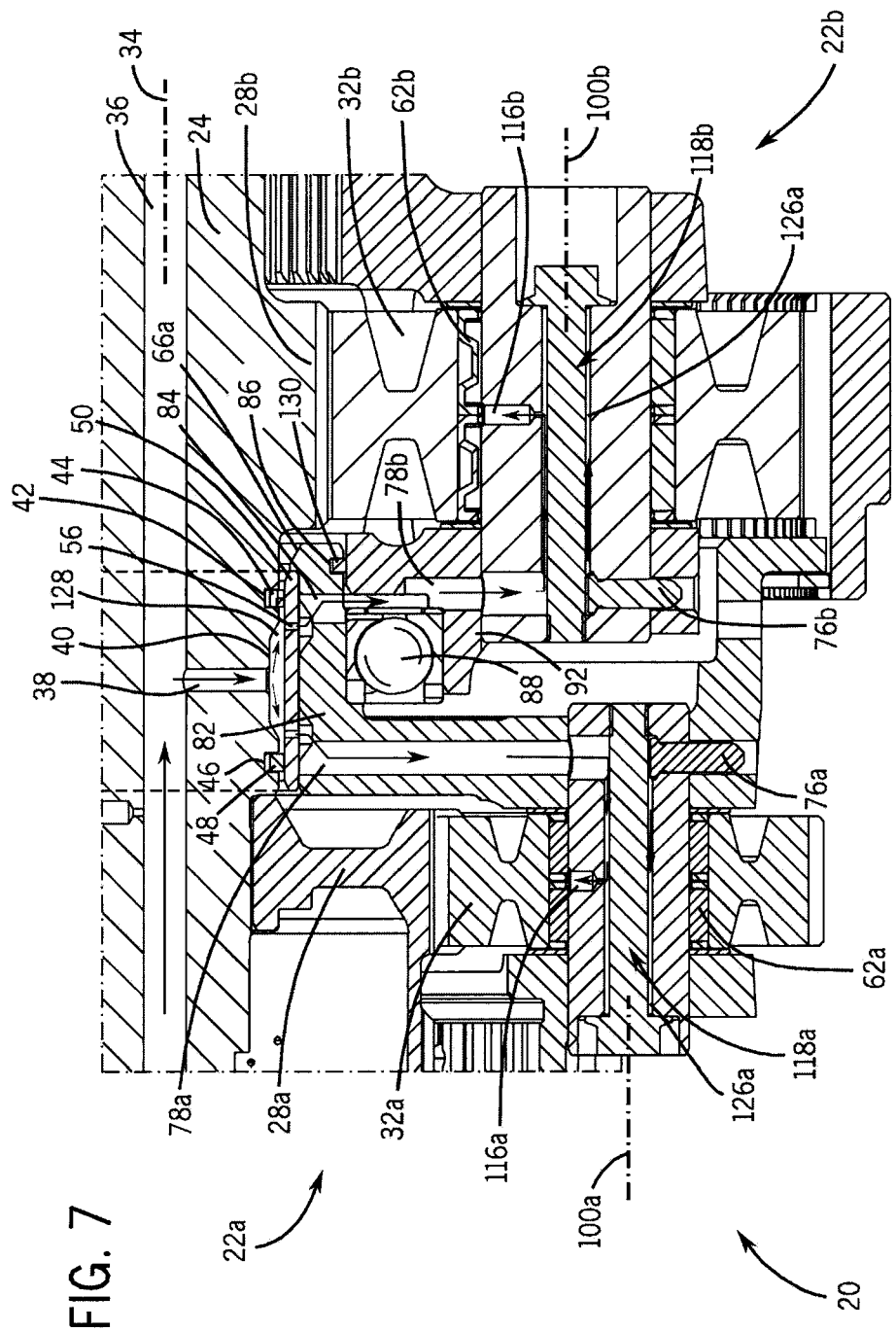
FIG. 7 is an enlarged partial cross-sectional view taken along line 7-7 of FIG. 6, showing the lubrication system.

Referring now also to FIGS. 3, 5, and 7, a sleeve 50, which may be a hollow cylinder having an inner surface 52 and an outer surface 54, may have a plurality of radial through-holes 56. The through-holes 56 may be distributed at different axial and/or circumferential locations of the sleeve 50. For example, as shown in FIG. 5, a total of six through-holes 56 may be provided in two sets of three through-holes 56, with the through-holes 56 in each set being axially aligned and spaced apart about 120 degrees. Each set of through-holes 56 may be axial spaced from one another.

If the first ring gear (not shown) and the second ring gear 30b are separate from the housing 26, they may engage the housing 26, such as through complementary splines 58b on an exterior surface of the second ring gear 30b interior surface of the housing 26. The first ring gear (not shown) and the second ring gear 30b may be coaxial with, and rotate about, the axis 34. The first ring gear (not shown) and the second ring gear 30b may have a plurality of gear teeth on an interior surface for engaging the pinion 32a and 32b, respectively. It will be appreciated that the ring gears may alternatively rotate independently of the housing 26.

The pinion 32a may be rotatably coupled to a gear or pinion carrier 60a, through a pinion bearing 62a and a pinion shaft 64a. The pinion bearing 62a may be a roller bearing, ball bearing, bushing, or any other suitable type of bearing. The pinion bearing 62a may have an inner race and an outer race with rollers or ball bearings situated between the inner race and outer race, which allow the inner race and outer race to rotate independently of each other. An inner radial surface of the pinion 32a may be rotatably mounted to the outer race of the pinion bearing 62a, such as through a press fit or thermal shrink fit. The outer radial surface of the pinion shaft 64a may interface with the inner race of the pinion bearing 62a, such that the pinion 32a may rotate relative to the pinion shaft 64a. The pinion 32a may have a plurality of teeth on its outer radial surface for engaging both the sun gear 28a and the ring gear (not shown).

Figure 6:
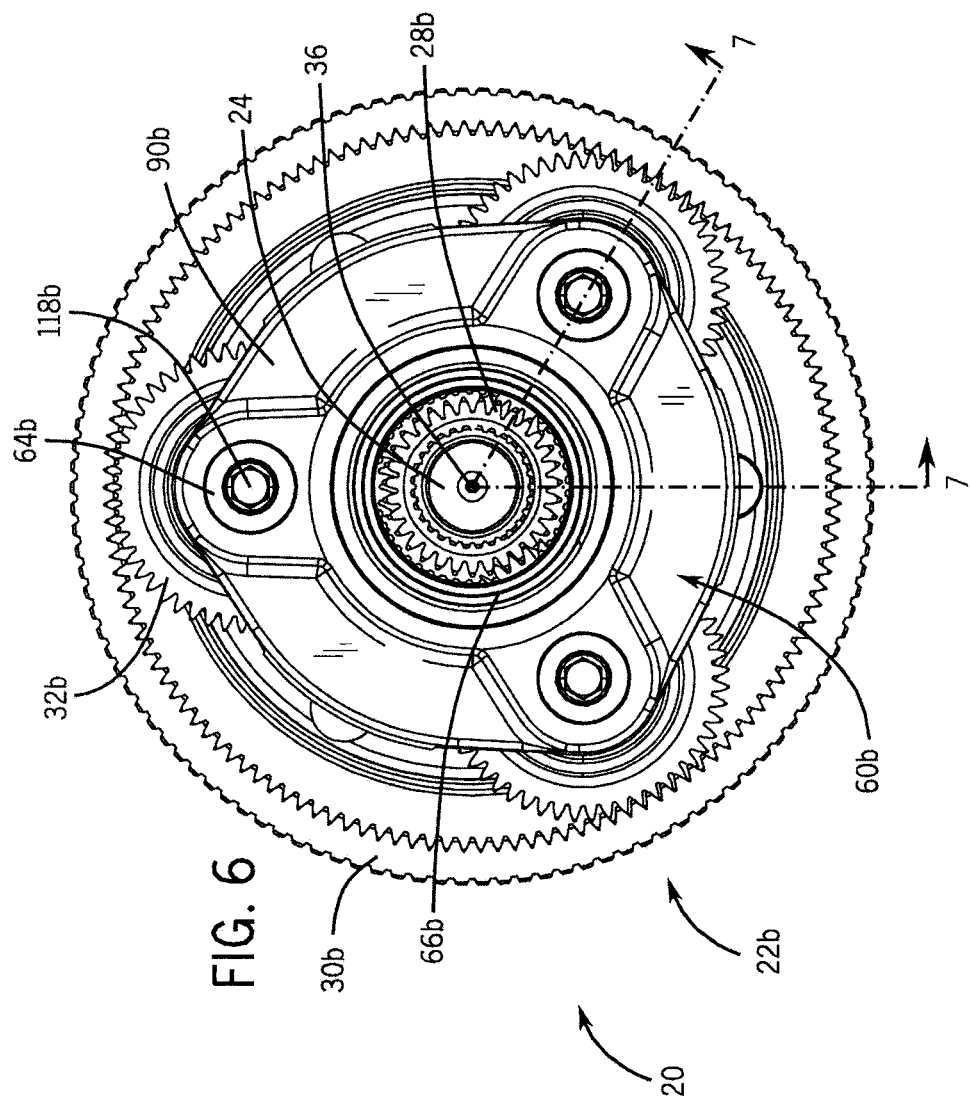
FIG. 6 is a front view of the example stacked planetary gear set of FIG. 2.

If multiple pinions 32a are provided, for example three as shown in FIGS. 2 and 6, then each pinion 32a may be rotatably mounted, through its own respective pinion bearing 62a and pinion shaft 64a, to the pinion carrier 60a. Multiple pinions 32a may be spaced an equal angular distance from each other, for example, 120 degrees apart as shown in FIG. 6. In some implementations, placing the pinions 32a an equal number of degrees apart balances the pinion carrier 60*a* resulting in smoother performance and more even wear. Alternatively, it will be appreciated that multiple pinions 32*a* may be spaced apart a non-equal number of degrees, or may also be at different radial locations on the pinion carrier 60*a*.

The pinion carrier 60*a* may be coaxial with, and rotate about, the axis 34. The pinion carrier 60*a* may be rotatably mounted to the sun gear shaft 24 through a bearing or bushing. In some implementations, the bearing allows the pinion carrier 60*a* to be radially and axially restrained with regard to the sun gear shaft 24, but allows the pinion carrier 60*a* to rotate independently of the sun gear shaft 24. It will be appreciated that the pinion carrier 60*a* may similarly be supported against the housing 26 using a bearing to allow the pinion carrier 60*a* to rotate independently of the housing 26.

The pinion carrier 60*a* may be generally cylindrical in shape, with an opening 66*a* passing through its axial center for accepting the sun gear shaft 24 and the sun gear 28*a*, as shown in FIG. 2. In implementations where the sun gear shaft 24 and sun gear 28*a* have different outer diameters, the inner diameter of the pinion carrier 60*a* defining the opening 66*a* may vary in the axial direction to accommodate both the sun gear shaft 24 and the sun gear 28*a*.

The pinion carrier 60*a* may have a mounting flange 68*a* with a mounting flange opening 70*a* passing axially through the mounting flange 68*a*. Alternatively, the mounting flange opening 70*a* may instead be a recess on the rearward facing axial surface and passing only partially through the mounting flange 68*a*.

Referring now to FIGS. 3 and 7, a pinion carrier first bore 72*a* may extend in a radially outward direction from the mounting flange opening 70*a* through at least a portion of the mounting flange 68*a* away from the axis 34. The diameter of the pinion carrier first bore 72*a* may be at least large enough to accept a retaining pin shank 74*a* of a retaining pin 76*a*. The pinion carrier first bore 72*a* may extend entirely through the mounting flange 68*a* or may have a terminal end. In some implementations, a pinion carrier second bore 78*a* is coaxial with the pinion carrier first bore 72*a*, but extending in an opposite radial direction from the mounting flange opening 70*a*, at least partially through the mounting flange 68*a*, toward the axis 34. The pinion carrier second bore 78*a* may have a diameter less than the diameter of a retaining pin head 80*a* to prevent the retaining pin head 80*a* from accidentally entering the pinion carrier second bore 78*a*.

Referring also to FIG. 4, the first pinion carrier 60*a* may have a hub 82 extending axially from the forward surface of the mounting flange 68*a* in a direction away from the rear flange 90*a* and toward the second gear or pinion carrier 60*b*. The hub 82 may have a pinion carrier third bore 84 extending radially through the hub 82 and axially forward of the pinion carrier second bore 78*a*. The hub 82 may have a third groove 86 circumferentially extending along the radially outer surface of the hub 82 and axially forward of the pinion carrier third bore 84. The inner race of a bearing 88, which may be any suitable type of bearing, such as a ball bearing, may interface with the hub 82 rearward of the pinion carrier third bore 84 and axially forward of the mounting flange 68*a* and the pinion carrier second bore 78*a*.

The second pinion carrier 60*b* may be oriented in an axially flipped manner compared to the first pinion carrier 60*a*, such that the mounting flange 68*b* is axially rearward of a rear flange 90*b*, as shown in FIGS. 2, 3 and 6. In other words, the mounting flange 68*a* of the first pinion carrier 60*a* may be closest to the mounting flange 68*b* of the second pinion carrier 60*b*, while the rear flanges 90*a* and 90*b* are farther away from one another. The second pinion carrier 60*b* may have a lip 92 extending axially from the rear surface of the mounting flange 68*a* toward the first pinion carrier 60*a*. The lip 92 may extend circumferentially around the second pinion carrier 60*b* and an inner surface may be part of the opening 66*b*. The radially inward surface of the lip 92 may accept the outer race of the bearing 88. The bearing 88 may be fully or partially sealed with an internal and/or external seal. If the bearing 88 is not sealed, or is partially sealed, the bearing 88 may be fluidly connected to the pinion carrier second bore 78*b* to receive the lubricating fluid.

Figure 8:
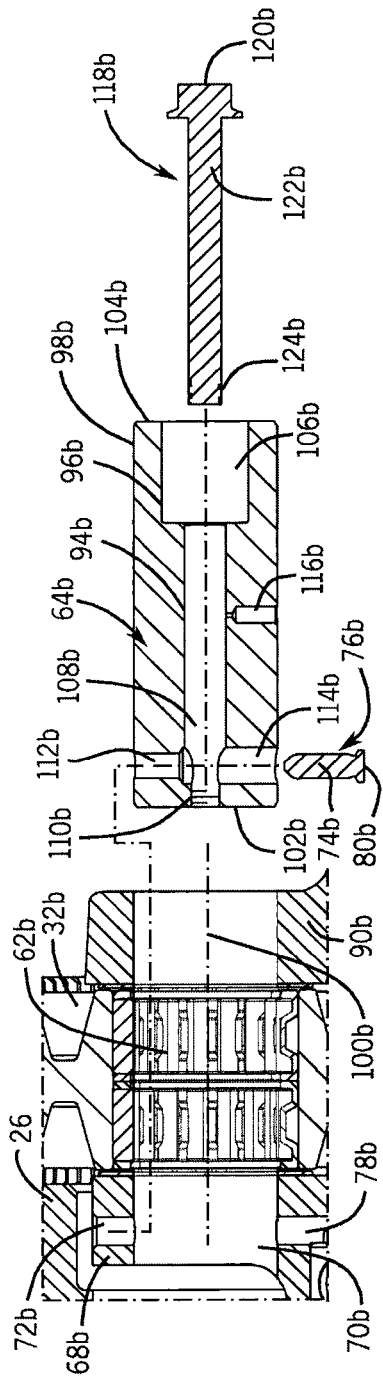
FIG. 8 is a partial exploded cross-sectional view of a pinion and pinion carrier of the planetary gear set of FIG. 2, showing an example lubrication arrangement for the pinion carrier and a pinion shaft.
Figure 9:
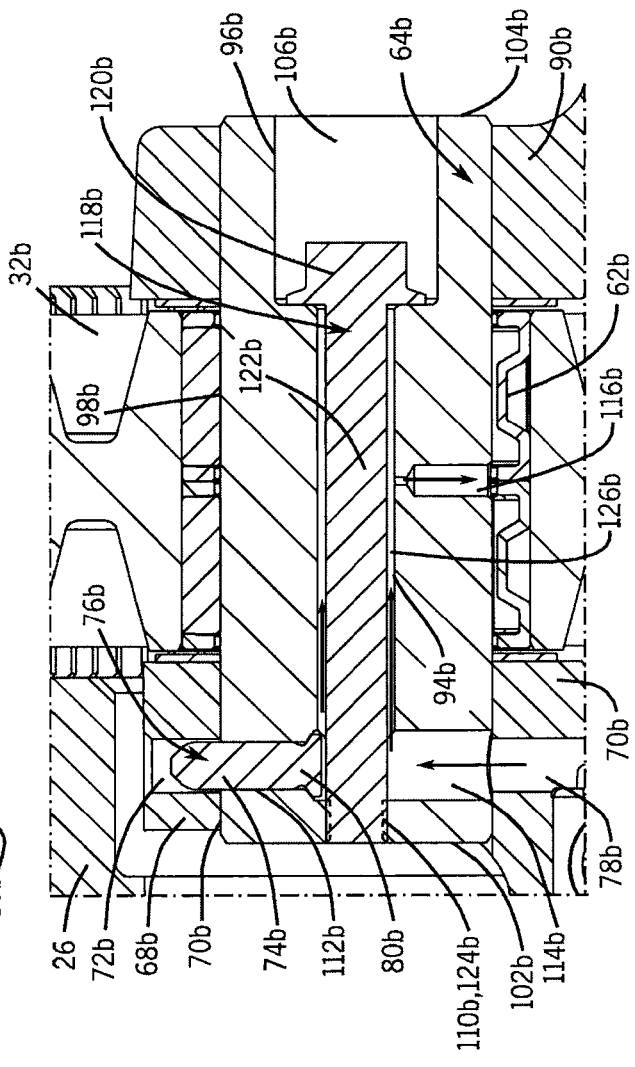
FIG. 9 is an enlarged partial cross-sectional view of the pinion and pinion carrier of the example stacked planetary gear set of FIG. 2, showing an example arrangement for the pinion carrier and the pinion shaft.

The pinion shaft 64*b*, as shown in greater detail in FIGS. 8 and 9, and similarly the pinion shaft 64*a*, may be cylindrical in shape, and rotatably and axially secured to the mounting flange 68*b* using the retaining pin 76*b*. The pinion shaft 64*b* has an inner diameter 94*b*, a middle diameter 96*b*, and an outer diameter 98*b*. The inner diameter 94*b* is between a pinion rotation axis 100*b* passing through the radial center of the pinion shaft 64*b* and the outer diameter 98*b*. The middle diameter 96*b* is radially between the inner diameter 94*b* and the outer diameter 98*b*. In some implementations, the outer diameter 98*b* is the radial outer surface of the pinion shaft 64*b* and is slightly smaller than the diameter of the mounting flange opening 70*b*, such that the pinion shaft 64*b* can at least partially fit inside the mounting flange opening 70*b*. A portion of the outer diameter 98*b* of the pinion shaft 64*b* toward a front axial end 102*b* may abut a portion of the mounting flange opening 70*b*. The front axial end 102*b* of the pinion shaft 64*b* is opposite a rear axial end 104*b*. A recessed portion 106*b* may extend from the rear axial end 104*b* toward the front axial end 102*b* in an axial direction and outward from the pinion rotation axis 100*b* to the middle diameter 96*b*. A shaft bore 108*b* may extend at least partially through the pinion shaft 64*b* from the recessed portion 106*b* toward the front axial end 102*b* in an axial direction and outward from the pinion rotation axis 100*b* to the inner diameter 94*b*. The shaft bore 108*b* may have shaft bore threads 110*b* at least partially along its axial length. The shaft bore threads 110*b*, for example, may be located toward the forward-most portion of the shaft bore 108*b*. The non-threaded portion of the shaft bore 108*b* may be smooth and may have a slightly larger diameter than the threaded portion of the shaft bore 108*b*. It will be appreciated that alternatively the recessed portion 106*b* may extend axially from the front axial end 102*b* toward the rear axial end 104*b*.

The pinion shaft 64*b* further may have a plurality of radial bores, namely a pinion shaft radial first bore 112*b*, pinion shaft radial second bore 114*b*, and a pinion shaft radial third bore 116*b*. In some implementations, the pinion shaft radial first bore 112*b* and the pinion shaft radial second bore 114*b* are located toward the front axial end 102*b* of the pinion shaft 64*b*, but rearward of the shaft bore threads 110*b*. The pinion shaft radial first bore 112*b* may extend through the pinion shaft 64*b* in a radial direction from the pinion rotation axis 100*b* through the outer diameter 98*b*. The pinion shaft radial first bore 112*b* may have a diameter at least equal to the diameter of the retaining pin head 80*b* at the inner diameter 94*b* and tapering inward to a diameter at least equal to the diameter of the retaining pin shank 74*b* at the outer diameter 98*b*. In some implementations, the pinion shaft radial second bore 114*b* is coaxial with the pinion shaft radial first bore 112*b*, but extends from the pinion rotation axis 100*b* to the outer diameter 98*b* in the opposite radial direction. The diameter of the pinion shaft radial first bore 112*b* may be at least as wide as the retaining pin head 80*b*. The pinion shaft radial third bore 116*b* may extend in a radial direction from the pinion rotation axis 100*b* through the outer diameter 98*b*. The pinion shaft radial third bore 116*b* may have a smaller diameter at the inner diameter 94b then at the outer diameter 98b to aid in metering the lubricating fluid.

The retaining pin 76b, as shown in FIG. 8 and mentioned above, may include the retaining pin shank 74b and the retaining pin head 80b. The diameter of the retaining pin head 80b may taper in the axial direction from a diameter larger than the diameter of the retaining pin shank 74b to a diameter equal to, or slightly less than the diameter of the retaining pin shank 74b as shown in FIG. 9. Alternatively, the retaining pin head 80b may not taper, and instead may have a diameter equal to, less than, or greater than the diameter of the retaining pin shank 74b. If the retaining pin head 80b tapers, then the taper may match the profile of the taper of the pinion shaft radial first bore 112b to maximize the surface area in contact between the retaining pin head 80b and the pinion shaft first radial first bore 112b. It will be appreciated that the retaining pin 76b described above is similar to the retaining pin 76a.

A fastener, such as a cap screw 118b as shown in FIGS. 7-9, may have a cap screw head 120b and a cap screw shank 122b. The cap screw 118b may also have cap screw threads 124b along a portion of the cap screw shank 122b. For example, the cap screw threads 124b may be located toward an axial end of the cap screw shank 122b opposite the cap screw head 120b. In some implementations, the diameter of the cap screw shank 122b is smaller than the diameter of the shaft bore 108b, such that the cap screw shank 122b can slide at least partially into the shaft bore 108b. It will be appreciated that the cap screw 118b described above is similar to the cap screw 118a.

The diameter of the cap screw shank 122b may vary along its axial length. In some implementations, an annular gap passage 126b, as shown in FIGS. 7 and 9, should be large enough to allow the lubricating fluid to flow through the annular gap passage 126b in the direction of the arrows shown in FIGS. 7 and 9. The cap screw 118b may slide into the shaft bore 108b, and the cap screw threads 124b may mesh with the shaft bore threads 110b to releasably retain the cap screw 118b in the shaft bore 108b. The cap screw head 120b may have a diameter wider than the shaft bore 108b, but smaller than the diameter of the recessed portion 106b, and may provide a fluid sealing function. The sealing function may be provided through a washer or sealing ring, or through a press fit between a portion of the cap screw shank 122b and a portion of the shaft bore 108b.

As shown in FIGS. 3 and 7, the sealing rings 44 and 48 may be inserted into the grooves 42 and 46, respectively. In some implementations, the sleeve 50 is slid in an axially direction over the sun gear shaft 24 until the sleeve 50 is disposed radially outward of the sealing rings 44 and 48, which are compressed due to the inner diameter of the sleeve 50 being smaller than the outer diameter of the sealing rings 44 and 48. Compression of the sealing rings 44 and 48 may fluidly seal the axial ends of the channel 40. A chamber 128 may be formed between the inner surface 52 of the sleeve 50 and the channel 40. The sleeve 50 may be rotated circumferentially and axially until the through-holes 56 are in the desired location. Alternatively, the sleeve 50 may be installed onto the first pinion carrier 60a and then the first pinion carrier 60a can be installed onto the sun gear shaft 24.

In some implementations, the first pinion carrier 60a is slid over the sun gear shaft 24 and the sleeve 50 until the hub 82 is disposed radially outward and axially aligned with at least a portion of the sleeve 50. The first pinion carrier 60a and the sleeve 50 may be rotated relative to one another until at least one of the through-holes 56 aligns with the pinion carrier second bore 78a and the pinion carrier third bore 84. The sleeve 50 may be rotationally and axially fixed to the first pinion carrier 60a, such as though a press fit, to keep the through-holes 56 alighted with the pinion carrier second bore 78a and the pinion carrier third bore 84 even while the first pinion carrier 60a is rotating relative to the sun gear shaft 24. A third seal 130 may be inserted into the third groove 86. The third seal 130 may have an outer diameter that is slightly larger than a portion of the inner diameter of the second pinion carrier 60b located near the mounting flange 68b. In some implementations, the inner race of the bearing 88 is at least partially retained, through a slight press fit, to the outer radial surface of the hub 82. The slight press fit may create a fluid seal between the bearing 88 and the hub 82 to at least partially prevent lubricating fluid from leaking out of the pinion carrier second bore 78b and the pinion carrier third bore 84 at this interface. The bearing 88 may allow the first pinion carrier 60a and the second pinion carrier 60b to rotate relative to one another, but also provide axial support between the two pinion carriers 60a and 60b. It will be appreciated that when only a single gear set is utilized, such as only gear set 22a, then the first pinion carrier 60a may not have the pinion carrier third bore 84, third groove 86, or third seal 130. In such an embodiment, only the pinion carrier second bore 78a needs to be aligned with the through-holes 56.

According to some implementations, the second pinion carrier 60b is slid over the hub 82 of the first pinion carrier 60a until the mounting flange 68a of the second pinion carrier 60b compresses the third seal 130 and the lip 92 abuts the bearing 88. The outer race of the bearing 88 may then be at least partially retained, through a slight press fit, to the lip 92. The slight press fit may create a fluid seal between the bearing 88 and the lip 92 to at least partially prevent lubricating fluid from leaking out of the pinion carrier second bore 78b at this interface. The integrated seal 132 may similarly fluidly seal against the lip 92. The pinion shaft 64a may abut the mounting flange opening on the outer diameter 98a toward the front axial end 102a of the pinion shaft 64a. In some implementations, the pinion carrier first bore 72a and the pinion shaft radial first bore 112a are coaxial and may have the same diameter at the interface between the two bores; and the pinion carrier second bore 78a and the pinion shaft radial second bore 114a are also coaxial at least at the interface between the two bores and may have the same or different diameters at the interface. The retaining pin 76a may fit within the pinion carrier first bore 72a and the pinion shaft radial first bore 112a such that at least a portion of the retaining pin shank 74a is within the pinion carrier first bore 72a and at least a portion of the retaining pin head 80a is within the pinion shaft radial first bore 112a.

The cap screw 118a may fit at least partially within the shaft bore 108a of the pinion shaft 64a. The cap screw 118a may be secured within the shaft bore 108a by meshing the cap screw threads 124a with the shaft bore threads 110a. The annular gap passage 126a may be formed between the cap screw shank 122a and the inner diameter 94a of the pinion shaft 64a. The annular gap passage 126a may extend in an axial direction from at least the pinion shaft radial second bore 114a to the pinion shaft radial third bore 116a. In some implementations, the width of the annular gap passage 126a in a radial direction should be wide enough to allow the lubricating fluid to freely pass through the annular gap passage 126a. It will be appreciated that the width of the annular gap passage 126a will depend on the fluid characteristics of the lubricating fluid, such as temperature and viscosity, as well as the desired flow rate of the lubricating fluid through the annular gap passage 126a. In some implementations, the cap screw head 120a abuts the pinion shaft 64a, fits entirely within the recessed portion, and forms a fluid seal between the recessed portion 106a and the annular gap passage 126a. The fluid seal may be accomplished, for example, through a sealing ring, washer, abutment of the cap screw head 120a and the pinion shaft 64a, or any other suitable sealing means.

According to some implementations, the lubricating fluid is supplied under pressure from a lubricating fluid reservoir (not shown) to the sun gear shaft axial bore 36. The lubricating fluid may pass through the sun gear shaft axial bore 36 to the sun gear shaft radial bore 38 to the chamber 128. The lubricating fluid may fill the chamber 128 and is then metered through the through-holes 56 prior to entering the pinion carrier second bore 78a and the pinion carrier third bore 84. The pinion carrier third bore 84 may supply lubricating fluid to the second pinion carrier 60b through the pinion carrier second bore 78b. The bearing 88 may be lubricated through the lubricating fluid flowing through the pinion carrier second bore 78b. The pinion carrier second bore 78a and 78b may supply lubricating fluid to the pinion shaft radial second bore 114a and 114b. Lubricating fluid may enter the pinion shaft 64a and 64b through the pinion shaft radial second bore 114a and 114b, travel through the annular gap passage 126a and 126b as shown by the arrows in FIG. 7, and exit the pinion shaft 64a and 64b through the pinion shaft radial third bore 116a and 116b. The pinion shaft radial third bore 116a and 116b may fluidly connects the pinion bearing 62a and 62b with the pinion shaft 64a and 64b and meter lubricating fluid to the pinion bearing 62a and 62b and the pinion 32a and 32b. It will be appreciated that additional pinion shaft radial bores may be used to fluidly connect the pinion shaft 64a and 64b and the pinion bearings 62a and 62b to ensure adequate lubrication of the pinion bearing 62a and 62b and the pinion 32a and 32b. At least partial lubrication of the pinion bearing 62a and 62b and the pinion 32a and 32b may be achieved through gravity, rotation of the pinion 32a and 32b, fluid pressure, centrifugal force, and/or any other suitable means. In some implementations, the lubricating fluid is prevented from exiting the pinion shaft 64a and 64b, except at the pinion shaft radial third bore 116a and 116b, by the meshing of the shaft bore threads 110a and 110b with the cap screw threads 124a and 124b, by the abutment of the cap screw head 120a and 120b with the recessed portion 106a and 106b, and the retaining pin 76a and 76b engaging the pinion shaft radial first bore 112a and 112b.

According to some implementations, the gear teeth of the sun gear 28a and 28b mesh with the gear teeth of the pinion 32a and 32b; the gear teeth of the ring gears 30b mesh with the gear teeth of the pinions 32a and 32b; and the gear teeth of the pinions 32a and 32b mesh with the gear teeth of the ring gears 30b and the gear teeth of the sun gears 28a and 28b. It will be appreciated that the sun gears 28a and 28b, the ring gears 30b, and the pinions 32a and 32b may, for example, be spur gears or helical gears. The gear ratio of the gear set 20 may be adjusted by locking certain gears and/or by selecting the first planetary gear set 22a or the second planetary gear set 22b. Locking the gears may be accomplished through various known actuators, forks, clutches, brakes, pistons, and/or any other suitable means. For example, the first planetary gear set 22a may be selected, and then the ratio may be varied by locking the pinion 32a and allowing the sun gear 28a and the ring gear to rotate. The sun gear 28a may be locked, or alternatively the ring gear may be locked. If two gears are locked, such as the ring gear and the pinion 32a, then a ratio of 1:1 may be achieved between an input and output shaft of the gear set 20. Alternatively, the second planetary gear set 22b may be chosen, and the sun gear 28b, ring gear 30b, and the pinion 32b, may be selectively locked to vary the gear ratio. It will be appreciated that different diameters between the gears in the first planetary gear set 22a and the second planetary gear set 22b will result in more gear ratios.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "has," "have," "having," "include," "includes," "including," "comprise," "comprises," "comprising," or the like, in this specification specifies the presence of stated features, integers, steps, operations, elements, and/or components, but does not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A gear set lubrication system, comprising:
   a sun gear shaft having a channel extending circumferentially around at least a portion of an outer surface of the sun gear shaft, the sun gear shaft having a sun gear shaft axial bore extending at least partially through the sun gear shaft in an axial direction, the sun gear shaft having a sun gear shaft radial bore extending radially from the sun gear shaft axial bore to the channel;
   a sleeve disposed about the sun gear shaft and having a first through-hole and cooperating with the channel to form a chamber extending circumferentially around at least a portion of the sun gear shaft; and
   a first gear carrier having an inner radial surface and an outer radial surface, the first gear carrier having a first gear carrier first radial bore extending from the inner radial surface at least partially toward the outer radial surface;
   wherein the first gear carrier first radial bore is fluidly connected to the chamber through the first through-hole.

2. The gear set lubrication system of claim 1, further comprising:
   a first gear coupled to a first gear shaft;
   a second gear coupled to a second gear shaft; and
   a third gear coupled to a third gear shaft;
   wherein the first gear shaft, the second gear shaft, and the third gear shaft are coupled to the first gear carrier.

3. The gear set lubrication system of claim 2, wherein the sleeve has a second through-hole and a third through-hole;
   wherein the first through-hole is fluidly connected to the first gear; the second through-hole is fluidly connected to the second gear, and the third through-hole is fluidly connected to the third gear.

4. The gear set lubrication system of claim 3, further comprising:
   a first gear shaft mounted to the first gear carrier, the first gear shaft having a first gear shaft first radial bore extending from an outer surface of the first gear shaft at least partially through the first gear shaft in a radial direction, the first gear shaft first radial bore being coaxial with the first gear carrier first radial bore, the first gear shaft having a first gear shaft axial bore having an axial bore diameter, the first gear shaft axial bore extending in an axial direction at least partially through the first gear shaft and through the first gear shaft first radial bore, the first gear shaft having a first gear shaft second radial bore extending radially from the first gear shaft axial bore toward the outer surface of the first gear shaft;
a fastener having a fastener shank disposed at least partially within the first gear shaft axial bore; and
an annular gap passage formed radially between the first gear shaft axial bore and the fastener shank and axially between the first gear shaft first radial bore and the first gear shaft second radial bore.

5. The gear set lubrication system of claim 4, further comprising:
a second gear carrier having an inner radial surface and an outer radial surface, the second gear carrier having a first radial bore extending from the inner radial surface at least partially toward the outer radial surface; and
wherein the sleeve has a fourth through-hole and the second gear carrier first radial bore is fluidly connected to the fourth through-hole.

6. The gear set lubrication system of claim 5, wherein the outer radial surface of the first gear carrier abuts the inner radial surface of the second gear carrier.

7. The gear set lubrication system of claim 5, wherein the first gear carrier has a first gear carrier second radial bore axially offset from the first gear carrier first radial bore; and
wherein the first gear carrier second radial bore is disposed radially between the second gear carrier first radial bore and the fourth through-hole and the first gear carrier second radial bore is fluidly connected to the second gear carrier first radial bore and the fourth through-hole.

8. The gear set lubrication system of claim 7, further comprising a gear carrier bearing;
wherein the first gear carrier has a hub extending axially from a forward portion of the first gear carrier toward the second gear carrier;
wherein the second gear carrier has a lip extending axially from a rearward portion of the second gear carrier toward the first gear carrier; and
wherein the gear carrier bearing is disposed axially between the first gear carrier and the second gear carrier, and the gear carrier bearing being disposed radially between the lip and the hub.

9. The gear set lubrication system of claim 1, wherein the sleeve is fixed relative to the first gear carrier and rotates relative to the sun gear shaft.

10. The gear set lubrication system of claim 1, wherein a lubricating fluid is supplied under pressure from a lubricating fluid reservoir to the chamber.

11. The gear set lubrication system of claim 1, further comprising:
a first groove extending circumferentially around the sun gear shaft axially forward of the channel;
a second groove extending circumferentially around the sun gear shaft axially rearward of the channel;
a first sealing member disposed in the first groove; and
a second sealing member disposed in the second groove;
wherein the sleeve extends axially and circumferentially over the first sealing member and the second sealing member to at least partially fluidly seal the chamber.

12. A gear set lubrication system, comprising:
a sun gear shaft having a channel extending circumferentially around at least a portion of the outer surface of the sun gear shaft, the sun gear shaft having a sun gear shaft axial bore extending at least partially through the sun gear shaft in an axial direction, the sun gear shaft having a sun gear shaft radial bore extending radially from the sun gear shaft axial bore to the channel;
a sleeve disposed about the sun gear shaft and having at least two through-holes and cooperating with the channel to form a chamber; and
a first gear carrier having an inner radial surface and an outer radial surface, the first gear carrier having a first gear carrier first radial bore extending from the inner radial surface at least partially toward the outer radial surface; and
a second gear carrier having an inner radial surface and an outer radial surface, the second gear carrier having a second gear carrier first radial bore extending from the inner radial surface at least partially toward the outer radial surface;
wherein the first gear carrier first radial bore is fluidly connected to the one of the through-holes, and the second gear carrier first radial bore is fluidly connected to another of the through-holes.

13. The gear set lubrication system of claim 12, further comprising:
a first gear coupled to a first gear shaft;
a second gear coupled to a second gear shaft;
a third gear coupled to a third gear shaft;
a fourth gear coupled to a fourth gear shaft;
a fifth gear coupled to a fifth gear shaft;
a sixth gear coupled to a sixth gear shaft; and
the sleeve having first through sixth through-holes;
wherein the first gear shaft, the second gear shaft, and the third gear shaft are coupled to the first gear carrier, the fourth gear shaft, the fifth gear shaft, respectively, and the sixth gear shaft is coupled to the second gear carrier; and
wherein the first through-hole is fluidly connected to the first gear, the second through-hole is fluidly connected to the second gear, the third through-hole is fluidly connected to the third gear, the fourth-through hole is fluidly connected to the fourth-gear, the fifth through-hole is fluidly connected to the fifth gear, and the sixth through-hole is fluidly connected to the sixth gear.

14. The gear set lubrication system of claim 12, further comprising a gear carrier bearing; and
wherein the first gear carrier has a hub extending axially from a front portion of the first gear carrier toward the second gear carrier; and wherein the second gear carrier has a lip extending axially from a rear portion of the second gear carrier toward the first gear carrier; and
wherein the gear carrier bearing is disposed axially between the first gear carrier and the second gear carrier, and the gear carrier bearing is disposed radially between the lip and the hub;
wherein the outer radial surface of the first gear carrier abuts the inner radial surface of the second gear carrier.

15. The gear set lubrication system of claim 14, further comprising:
a first gear shaft mounted to the first gear carrier, the first gear shaft having a first gear shaft first radial bore extending from an outer surface of the first gear shaft at least partially through the first gear shaft in a radial direction, the first gear shaft first radial bore being coaxial with the first gear carrier first radial bore, the first gear shaft having a first gear shaft axial bore having a first gear shaft axial bore diameter, the first gear shaft axial bore extending in an axial direction at least partially through the first gear shaft and through the first gear shaft first radial bore, and a first gear shaft second radial bore extending radially from the first gear shaft axial bore toward the outer surface of the first gear shaft;

a second gear shaft mounted to the second gear carrier, the second gear shaft having a second gear shaft first radial bore extending from an outer surface of the second gear shaft at least partially through the second gear shaft in a radial direction, the second gear shaft first radial bore being coaxial with the second gear carrier first radial bore, the second gear shaft having a second gear shaft axial bore having a second gear shaft axial bore diameter, the second gear shaft axial bore extending in an axial direction at least partially through the second gear shaft and through the second gear shaft first radial bore, and a second gear shaft second radial bore extending radially from the second gear shaft axial bore toward the outer surface of the second gear shaft;

a first fastener having a first fastener shank, the first fastener shank disposed at least partially within the first gear shaft axial bore;

a second fastener having a second fastener shank, the second fastener shank disposed at least partially within the second gear shaft axial bore;

a first annular gap passage formed radially between the first shaft axial bore and the first fastener shank and axially between the first gear shaft first radial bore and the first gear shaft second radial bore; and a second annular gap passage formed radially between the second shaft axial bore and the second fastener shank and axially between the second gear shaft first radial bore and the second gear shaft second radial bore.

16. The gear set lubrication system of claim 12, wherein the sleeve is fixed relative to the first gear carrier and rotates relative to the sun gear shaft.

17. The gear set lubrication system of claim 12, wherein a lubricating fluid is supplied under pressure from a lubricating fluid reservoir to the chamber.

18. A method of lubricating a gear, comprising:

providing a sun gear shaft having a channel extending circumferentially around at least a portion of the sun gear shaft, a sun gear shaft radial bore extending from the channel at least partially through the sun gear shaft in a radial direction, a sun gear shaft axial bore extending in an axial direction at least partially through the sun gear shaft and through the sun gear shaft radial bore;

providing a sleeve disposed radially outward and circumferentially and axially over the channel, the sleeve having a first through-hole and cooperating with the channel to form a chamber extending circumferentially around at least a portion of the sun gear shaft;

providing a first gear carrier having a first gear carrier radial bore;

fluidly connecting the sun gear shaft axial bore, the sun gear shaft radial bore, the channel, the first through-hole, and the first gear carrier radial bore; and supplying lubricating fluid to the sun gear shaft.

19. The method of claim 18, further comprising:

providing a second gear carrier having a second gear carrier radial bore; and fluidly connecting the sun gear shaft axial bore, the sun gear shaft radial bore, the channel, the a second through-hole, and the second gear carrier radial bore.

20. The method of claim 18, further comprising:

providing a gear shaft mounted to the first gear carrier, the gear shaft having a gear shaft first radial bore coaxial with the first gear carrier radial bore, a gear shaft second radial bore, and a gear shaft axial bore having an axial bore diameter;

providing a gear and gear bearing mounted to the gear shaft;

providing a fastener having a fastener shank, the fastener shank having a fastener shank diameter less than the gear shaft axial bore diameter, the fastener shank at least partially disposed within the gear shaft axial bore defining an annular gap passage between the gear shaft axial bore and the fastener shank; and fluidly connecting the first gear carrier radial bore, the gear shaft first radial bore, the annular gap passage, the gear shaft second radial bore, the gear bearing, and the gear.

* * * * *